United States Patent [19]

Paisley

[11] Patent Number: 4,843,274

[45] Date of Patent: Jun. 27, 1989

[54] BRUSH HOLDER

[75] Inventor: Thomas D. Paisley, Commack, N.Y.

[73] Assignee: Aircraft Parts Corp., Farmingdale, N.Y.

[21] Appl. No.: 695,872

[22] Filed: Jan. 28, 1985

[51] Int. Cl.$^4$ .......................................... H02K 13/00
[52] U.S. Cl. ..................................... 310/239; 310/45; 310/71; 310/49 R
[58] Field of Search ............... 310/239, 240, 241, 242, 310/244, 245, 246, 247, 248, 249, 71, 45; 439/883

[56] References Cited

U.S. PATENT DOCUMENTS

| | | | |
|---|---|---|---|
| 1,433,686 | 10/1922 | Siebenmorgen | 310/249 |
| 1,844,174 | 2/1932 | Munday | 310/249 |
| 2,677,777 | 5/1954 | West | 310/244 |
| 4,166,968 | 9/1979 | Prittie | 310/239 |
| 4,394,533 | 7/1983 | Naito | 439/883 |

FOREIGN PATENT DOCUMENTS 0832471 9/1938 France .................. 310/249

Primary Examiner—R. Skudy
Attorney, Agent, or Firm—Daniel J. Tick

[57] ABSTRACT

In a dynamoelectric machine having a housing, a rotatable commutator within the housing, a brush contacting the commutator, an electrically conductive brush holder affixed to the housing and supporting the brush, a brush pigtail connected to the brush, an electrical conductor connected to the pigtail at a junction, and a flange extending from the brush holder, the flange having a hole formed therethrough and spaced opposite first and second surfaces, a support device extends from the flange and passes through the hole for supporting the junction of the pigtail and the conductor. The support device includes a first insulator which electrically isolates the junction from the flange at the first surface of the flange. A second insulator electrically isolates the junction from the flange at the second surface of the flange. A third insulator electrically isolates the junction from the flange in the hole.

13 Claims, 4 Drawing Sheets

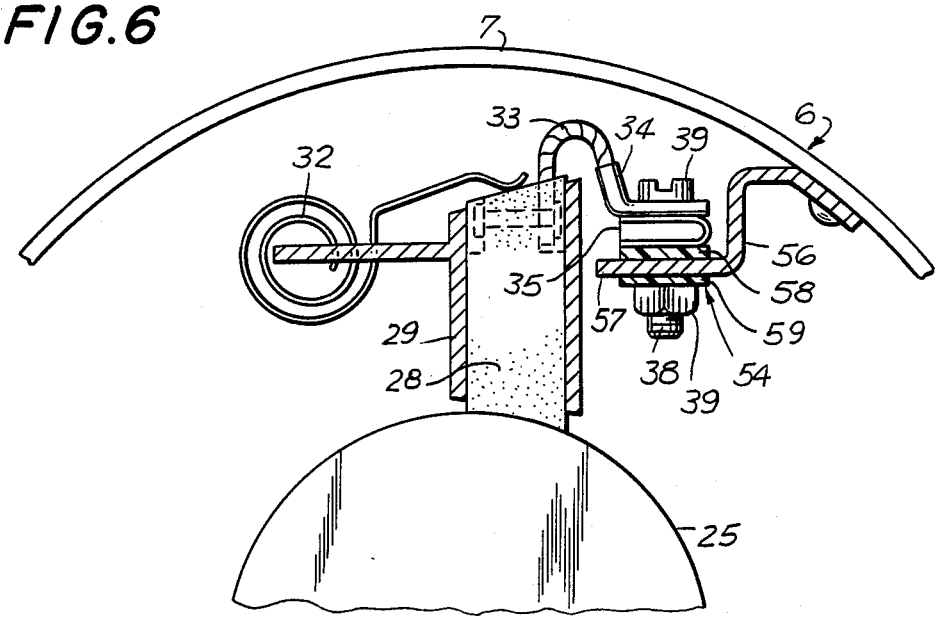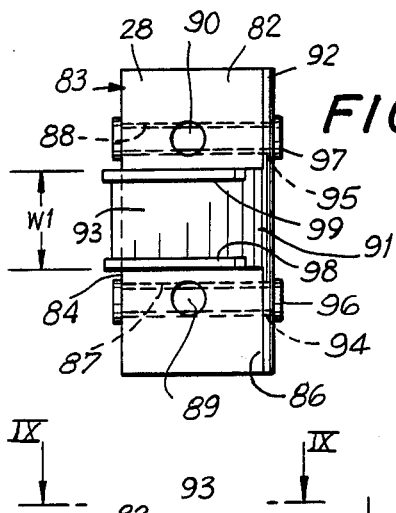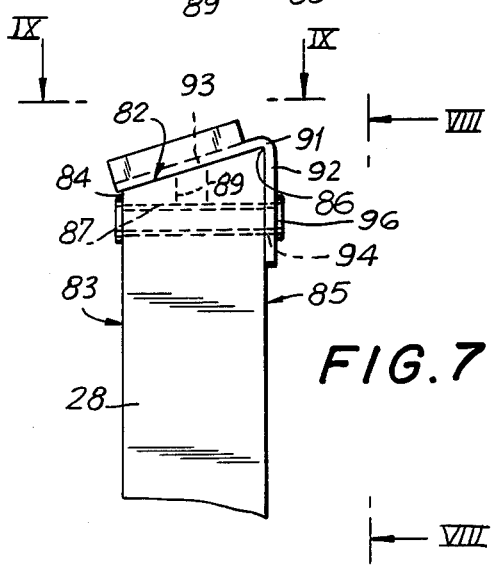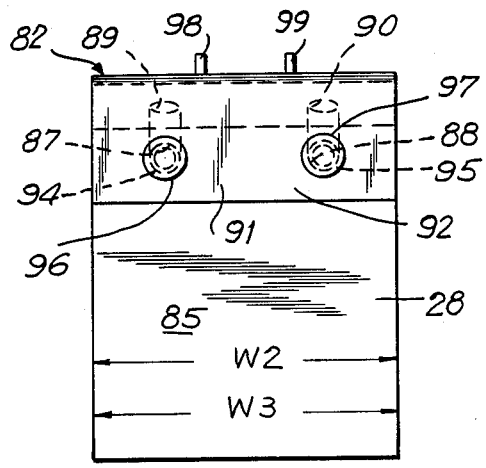

BRUSH HOLDER

BACKGROUND OF THE INVENTION

The invention relates to dynamoelectric machines having commutators and brushes. More particularly, the invention relates to direct current electric motors and generators.

In such machines, very large currents flow between the carbon composition brushes and the commutator. Such large current flows result in localized heating due to the combination of resistive heating at the contact face and machine commutation. If sufficiently severe, change of state of materials may occur. This may cause electrical arcing with intense heating which will melt materials such as stainless steel in the brush holders and copper alloys in the commutators. It is therefore of great importance to prevent the creation of arcing between the portions of the brush holder and the commutator.

In the conventional design of many DC motors, a flange or similar member, which is a portion of the brush holder, supports the junction between the brush pigtail and the stator lead. The brush holder is commonly formed from stainless steel or some other electrically conductive material, and the flange or other portion of the brush holder supporting the junction is similarly constructed of electrically conductive material. In the known apparatus, arcing may develop between the commutator and the lower edge of the holder, which is in close proximity with the commutator, under conditions of especially heavy current through the machine. Arcing seriously damages the holders, brushes, and commutators and causes eventual failure of the machine. Thus, the brush holder may be distorted or altered in a manner which prevents the spring loaded brush it holds from being urged into full contact with the commutator.

The principal object of the invention is to provide a support for the junction between the brush pigtail and the stator lead to prevent damage to a dynamoelectric machine due to heavy current flow through the brushes.

An object of the invention is to provide a support for the junction between the brush pigtail and the stator lead which prevents damage of a dynamoelectric machine due to heavy current flow through the brushes by preventing arcing between the brush holder and the commutator.

Another object of the invention is to provide a support for the junction between the brush pigtail and the stator lead which prevents damage of a dynamoelectric machine due to heavy current flow through the brushes by preventing arcing between the brush holder and the commutator, without requiring major redesign of the machine.

Still another object of the invention is to provide a support for the junction between the brush pigtail and the stator lead, which support is installable with facility and convenience and is inexpensive in manufacture and installation, and prevents damage of a dynamoelectric machine due to having current flow through the brushes by preventing arcing between the brush holder and the commutator.

Yet another object of the invention is to provide a terminal from the brush pigtail to the junction with the stator lead of a dynamoelectric machine, which terminal prevents damage to the machine due to heavy current flow through the brushes by conducting maximum current.

Another object of the invention is to provide a terminal from the brush pigtail to the junction with the stator lead of a dynamoelectric machine, which terminal prevents damage to the machine due to heavy current flow through the brushes by conducting maximum current to avoid overheating.

Still another object of the invention is to provide a terminal from the brush pigtail to the junction with the stator lead of a dynamoelectric machine, which terminal is inexpensive in manufacture and installed and utilized in the same manner as known terminals of the same type, and which prevents damage to the machine due to heavy current flow through the brushes by conducting maximum current to avoid overheating.

Yet another object of the invention is to provide a brush for the commutator of a dynamoelectric machine, said brush assuring a good electrical connection of said brush to the junction with the stator lead of the machine.

BRIEF SUMMARY OF THE INVENTION

In accordance with the invention, a dynamoelectric machine having a housing, a rotatable commutator within the housing, a brush contacting the commutator, an electrically conductive brush holder affixed to the housing and supporting the brush, a brush pigtail connected to the brush, an electrical conductor connected to the pigtail at a junction, and a flange extending from the brush holder, the flange having a hole formed therethrough and spaced opposite first and second surfaces. The machine comprises support means affixed to the flange and passing through the hole for supporting the junction of the pigtail and the conductor. The support means includes a first insulator which electrically isolates the junction from the flange at the first surface of the flange, a second insulator which electrically isolates the junction from the flange at the second surface of the flange, and a third insulator which electrically isolates the junction from the flange in the hole.

The first insulator consists of a first washer of electrically insulative material interposed between the junction and the first surface of the flange.

The second insulator consists of a second washer of electrically insulative material interposed between the junction and the second surface of the flange.

The third insulator consists of a sleeve of electrically insulative material interposed between the junction and the flange.

The brush has a top surface spaced from the commutator, a front surface meeting the top surface at a front edge thereof and a back surface meeting the top surface at a spaced opposite rear edge thereof. First and second spaced substantially parallel side holes are formed through the brush and open on the front and rear surfaces. First and second spaced substantially parallel top holes are formed in the brush and open on the top surface and extend to the first and second side holes, respectively. The top holes accommodate a plurality of brush pigtails. An electrically conductive hammer plate has a back plate and a top plate extending from the back plate at an acute angle therewith. The back plate has a pair of spaced holes formed therethrough. First and second electrically conductive members extend through the holes of the back plate and the first and second side holes of the brush and affix the hammer plate to the brush with the back plate in juxtaposition with the bar surface of the brush and the top plate in juxtaposition with the top surface of the brush. The brush pigtails accommodated in the first and second top holes are in electrical contact with the first and second electrically conductive members, respectively.

The sleeve extends between the junction and the first and second washers.

An electrically insulative sleeve encases the brush pigtail.

The electrically conductive members comprise substantially solid rivets.

The top plate of the hammer plate has a width dimension whereby it is positioned between and spaced from the first and second top holes and the back plate of the hammer plate has a width dimension greater than that of the top plate and extends over the width of the back surface of the brush.

The top plate has a pair of flanges extending at substantially right angles thereto at spaced opposite side edges thereof.

In accordance with another embodiment of the invention, a dynamoelectric machine having a housing, a rotatable commutator within the housing, a brush contacting the commutator, an electrically conductive brush holder affixed to the housing and supporting the brush, a brush pigtail connected to the brush and an electrical conductor connected to the pigtail at a junction. The machine comprises support means affixed to the housing for supporting the junction of the pigtail and the conductor. The support means includes a bracket extending from the housing, the bracket having a hole formed therethrough and spaced opposite first and second surfaces, a first insulator which electrically isolates the junction from the bracket at the first surface of the bracket, a second insulator which electrically isolates the junction from the bracket at the second surface of the bracket, and a third insulator which electrically isolates the junction from the bracket in the hole.

The first insulator consists of a first washer of electrically insulative material interposed between the junction and the first surface of the bracket.

The second insulator consists of a second washer of electrically insulative material interposed between the junction and the second surface of the bracket.

The third insulator consists of a sleeve of electrically insulative material interposed between the junction and the bracket.

The brush has a top surface spaced from the commutator, a front surface meeting the top surface at a front edge thereof and a back surface meeting the top surface at a spaced opposite rear edge thereof. First and second spaced substantially parallel side holes are formed through the brush and open on the front and rear surfaces. First and second spaced substantially parallel top holes are formed in the brush and open on the top surface and extend to the first and second side holes, respectively. The top holes accommodate a plurality of brush pigtails. An electrically conductive hammer plate has a back plate and a top plate extending from the back plate at an acute angle therewith. The back plate has a pair of spaced holes formed therethrough. First and second electrically conductive members extend through the holes of the back plate and th first and second side holes of the brush and affix the hammer plate to the brush with the back plate in juxtaposition with the back surface of the brush and the top plate in juxtaposition with the top surface of the brush. The brush pigtails accommodated in the first and second top holes are in electrical contact with the first and second electrically conductive members, respectively.

The sleeve extends between the junction and the first and second washers.

An electrically insulative sleeve encases the brush pigtail.

The electrically conductive members comprise substantially solid rivets.

The top plate of the hammer plate has a width dimension whereby it is positioned between and spaced from the first and second top holes and the back plate of the hammer plate has a width dimension greater than that of the top plate and extends over the width of the back surface of the brush.

The top plate has a pair of flanges extending at substantially right angles thereto at spaced opposite side edges thereof.

In accordance with the invention, a dynamoelectric machine having a housing, a rotatable commutator within the housing, a brush contacting the commutator, an electrically conductive brush holder affixed to the housing and supporting the brush, a brush pigtail having a first end connected to the brush and a second end, the pigtail having a plurality of stranded electrically conductive wires, an electrical conductor connected to the pigtail at a junction, and a flange extending from the brush holder, the flange having a hole formed therethrough and spaced opposite first and second surfaces. The machine comprises a terminal at the second end of the pigtail for conducting maximum current between the brush and the junction of the pigtail and the conductor. The terminal accommodates a plurality of pigtails, each extending through the terminal. A hole is formed through the terminal at which electrical connection is made with the junction. The hole intercepts a group of the plurality of pigtails whereby electrical connection is directly effected between the pigtails and the junction.

The terminal comprises a substantially rectangular parallelepiped having first and second spaced opposite substantially parallel open ends and bent along a line substantially parallel to the first and second ends and spaced therefrom to form an angular member. The plurality of pigtails pass into the terminal via the first end, being positioned substantially side by side in the terminal and extending to the second end.

Insulative means is provided for electrically isolating the junction from the flange at the first and second surfaces of the flange.

The insulative mean comprises support means affixed to the flange and passing through the hole through the flange for supporting the junction of the pigtail and the conductor. The support means includes a first washer of electrically insulative material interposed between the junction and the first surface of the flange, a second washer of electrically insulative material interposed between the junction and the second surface of the flange, and a sleeve of electrically insulative material interposed between the junction and the flange and extending through the hole through the flange between the junction and the first and second washers.

The terminal further comprises first and second spaced opposite substantially parallel sides joining the first and second ends and substantially perpendicular thereto. The terminal is bent along a line closer to the first end than to the second end. The hole through the terminal is in proximity with the second end and substantially equidistant from the first and second sides.

In accordance with the invention, a dynamoelectric machine having a housing, a rotatable commutator within the housing, a brush contacting the commutator, an electrically conductive brush holder affixed to the housing and supporting the brush, a brush pigtail having a first end connected to the brush and a second end, the pigtail having a plurality of stranded electrically conductive wires, an electrical conductor connected to the pigtail at a junction. The machine comprises support means affixed to the housing and passing through the hole for supporting the junction of the pigtail and the conductor. The support means includes a bracket extending from the housing, the bracket having a hole formed therethrough and spaced opposite first and second surfaces, a first insulator which electrically isolates the junction from the bracket at the first surface of the bracket, a second insulator which electrically isolates the the junction from the bracket at the second surface of the bracket, a third insulator which electrically isolates the junction from the bracket in the hole. A terminal at the second end of the pigtail for conducting maximum current between the brush and the junction accommodates the plurality of pigtails. Each of the pigtails extends through the terminal. The terminal has a hole formed therethrough at which electrical connection is made with the junction. The hole intercepts a group of the plurality of pigtails whereby electrical connection is directly effected between the pigtails and the junction.

The brush has a top surface spaced from the commutator, a front surface meeting the top surface at a front edge thereof and a back surface meeting the top surface at a spaced opposite rear edge thereof. First and second spaced substantially parallel side holes are formed through the brush and open on the front and rear surfaces. Fist and second spaced substantially parallel top holes are formed in the brush and open on the top surface and extend to the first and second side holes, respectively. The top holes accommodate a plurality of brush pigtails. An electrically conductive hammer plate has a back plate and a top plate extending from the back plate at an acute angle therewith. The back plate has a pair of spaced holes formed therethrough. First and second electrically conductive members extend through the holes of the back plate and the first and second side holes of the brush and affix the hammer plate to the brush with the back plate in juxtaposition with the back surface of the brush and the top plate in juxtaposition with the top surface of the brush. The brush pigtails accommodated in the first and second top holes are in electrical contact with the first and second electrically conductive members, respectively.

An electrically insulative sleeve encases the brush pigtail.

In accordance with the invention, in a terminal for conducting maximum current of a plurality of electrical conductors to a junction, the terminal accommodating the plurality of conductors. Each of the conductors extends through the terminal. The terminal has a hole formed therethrough at which electrical connection is made with the junction. The hole intercepts a group of the plurality of conductors whereby electrical connection is directly effected between the conductor and the junction.

The terminal comprises a substantially rectangular parallelepiped having first and second spaced opposite substantially parallel open ends and bent along a line substantially parallel to the first and second ends and spaced therefrom to form an angular member. The plurality of conductors pass into the terminal via the first end and are positioned substantially side by side in the terminal and extending to the second end.

In accordance with the invention, a brush for the commutator of a dynamoelectric machine has a top surface spaced from the commutator, a front surface meeting the top surface at a front edge thereof and a back surface meeting the top surface at a spaced opposite rear edge thereof. The brush comprises first and second spaced substantially parallel side holes formed through the brush and opening on the front and rear surfaces. First and second spaced substantially parallel top holes are formed in the brush opening on the top surface and extend to the first and second side holes, respectively. The top holes accommodate a plurality of brush pigtails. An electrically conductive hammer plate has a back plate and a top plate extending from the back plate at an acute angle therewith. The back plate has a pair of spaced holes formed therethrough. First and second electrically conductive members extend through the holes of the back plate and the first and second side holes of the brush and affix the hammer plate to the brush with the back plate in juxtaposition with the back surface of the brush and the top plate in juxtaposition with the top surface of the brush. The brush pigtails accommodated in the first and second top holes are in electrical contact with the first and second electrically conductive members, respectively.

The electrically conductive members comprise substantially solid rivets.

The top plate of the hammer plate has a width dimension whereby it is positioned between and spaced from the first and second top holes and the back plate of the hammer plate has a width dimension greater than that of the top plate and extends over the width of the back surface of the brush.

The top plate has a pair of flanges extending at substantially right angles thereto at spaced opposite side edges thereof.

BRIEF DESCRIPTION OF THE DRAWINGS

In order that the invention may be readily carried into effect, it will now be described with reference to the accompanying drawings, wherein:

FIG. 6 is an end sectional view of the motor, on an enlarged scale, of a modification of the embodiment of the support device of FIG. 5;

FIG. 7 is a side view, on an enlarged scale, of an embodiment of a brush of the invention for the motor;

FIG. 8 is a side view, on an enlarged scale, taken along the lines VIII—VIII, of FIG. 7;

FIG. 9 is a top plan, on an enlarged scale, taken along the lines IX—IX, of FIG. 7;

DETAILED DESCRIPTION OF THE PREFERRED EMBODIMENTS

Figure 1:
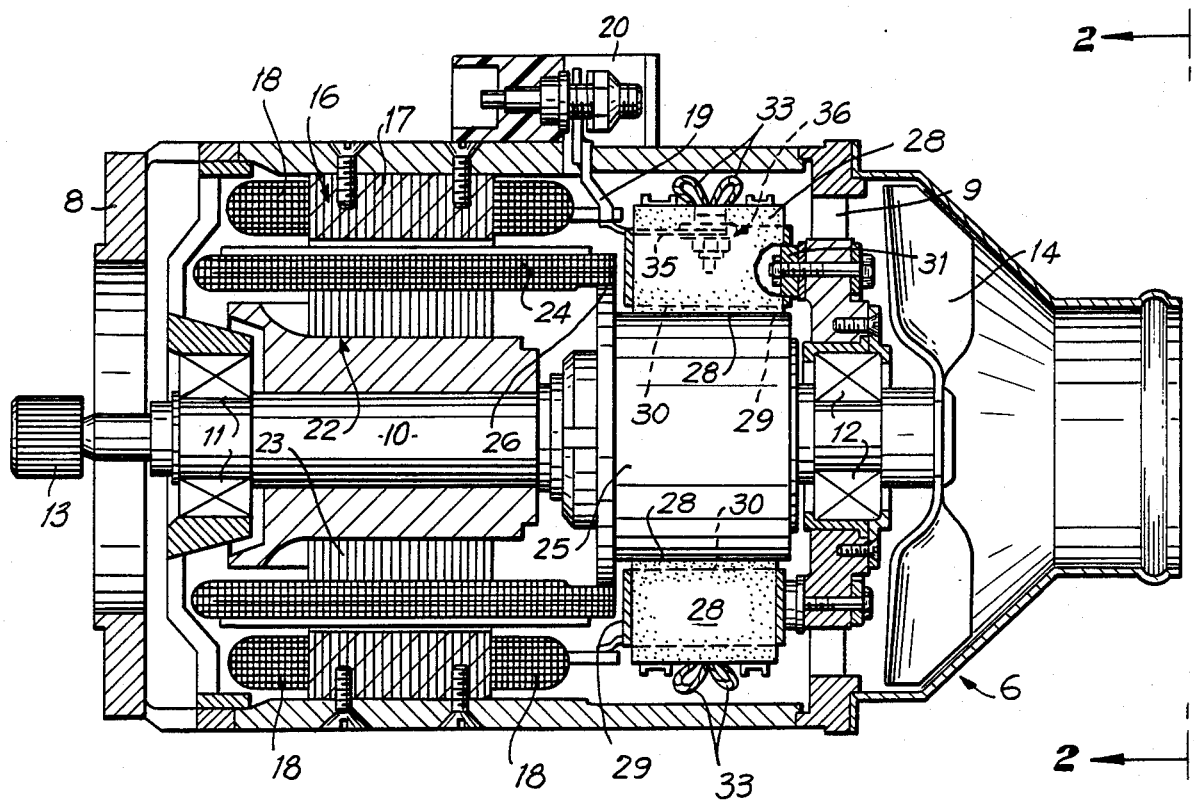
FIG. 1 is a side view, partly in section, of a DC motor having the support device and terminal of the invention.
Figure 2:
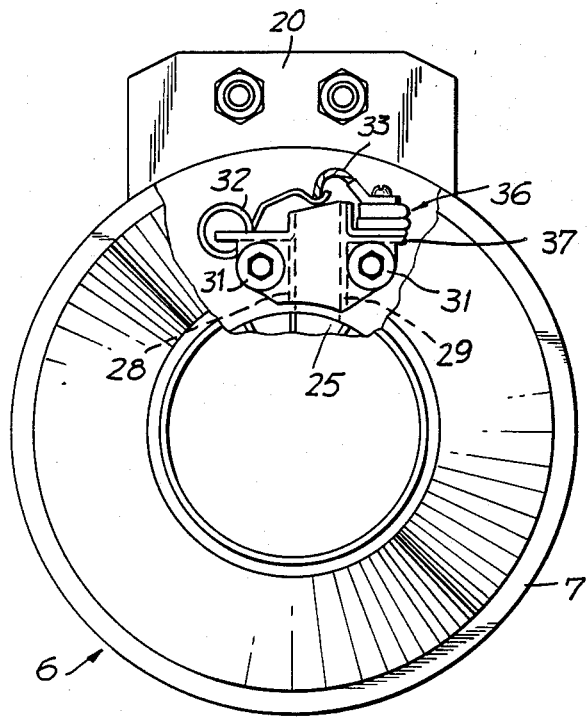
FIG. 2 is a fragmented end view of the motor, taken along the lines II—II, of FIG. 1.

FIG. 1 shows a conventional DC electric motor 6 incorporating the improved support device and terminal of the invention. The motor 6 has an outer housing 7 including an end shield assembly 8 and a support assembly 9. A shaft 10 is centrally mounted for rotation and supported by bearing assemblies 11 and 12 adjacent to end shield assembly 8 and support assembly 9, respectively. The shaft 10 has a drive connection 13 at one end and a fan 14 at the other end. Mounted within the housing 7 is a field or stator assembly 16 comprising a laminated stator core 17 supporting a plurality of stator windings 18. The stator windings 18 are connected to a stator winding terminal 19 through which current enters the motor 6 by suitable connections to a terminal block 20 mounted outside the housing 7.

A rotor or armature 22 is supported on the rotatable shaft. The armature 22 includes a laminated core 23 and a plurality of armature windings 24. A commutator 25 is supported on one end of the shaft 10. The commutator 25 is connected through portions 26 to the armature windings 24. Electrical contact brushes 28, usually of a carbon composition, are supported in brush holders 29 and contact the commutator 25. The brush holders 29 are commonly made of stainless steel or other similar material. In the embodiment shown, the motor 6 is a four-pole device having two pairs of brushes 28.

Each brush holder 29 surrounds and supports the brush 28 therein with the brush extending slightly beyond the bottom edge 30 of the holder in the usual manner, so that the holder does not rub against the commutator 25. The brush holder 29 has a flange assembly 31 at one end for attaching the holder to the support assembly 9. Brush springs 32 along one side of the holder 29 urge the brush 28 radially inwardly to maintain electrical contact with the commutator 25. Each brush 28 has an attached shunt or pigtail 33 having a terminal or lug 34 at the free end thereof for providing a current path to and from the brushes. The pigtails 33 are usually formed of stranded copper conductive wires and are electrically connected to the stator windings 18 through a lead 35 from the stator winding terminal 19. The junction 36, at which the pigtail terminal 34 is connected to the stator lead 35, is commonly supported on a unitary support member or flange 37 formed along the side of the brush holder 29 opposite the brush springs 32, and secured with means such as a screw 38 and nut 39. The flange 37 has a hole 40 formed therethrough and spaced opposite first and second surfaces 41 and 42, respectively (FIG. 4).

The flange 37 along the side of the brush holder 29 provides an electrical path which is parallel to the desired path through the brush 28. More particularly, current travels from the stator lead 35 through the flange and along the brush holder 29, resulting in undesirable arcing between the bottom edge 30 of the brush holder and the commutator 25. This undesired electrical path is parallel to the desired path from the stator lead 35 through the pigtail 33 and the brush 28 to the commutator 25.

Figure 3:
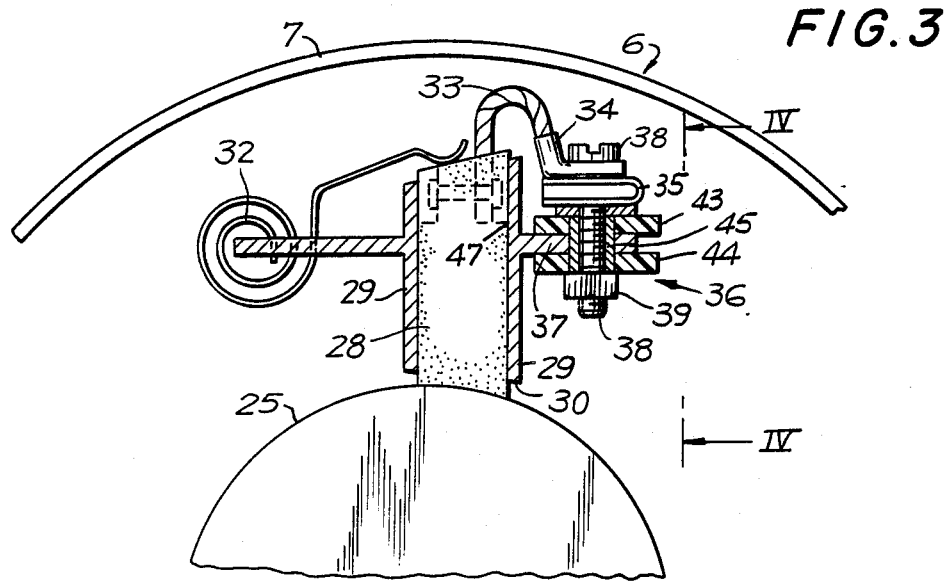
FIG. 3 is an end sectional view of the motor, on an enlarged scale, showing an embodiment of the support device of the invention.
Figure 4:
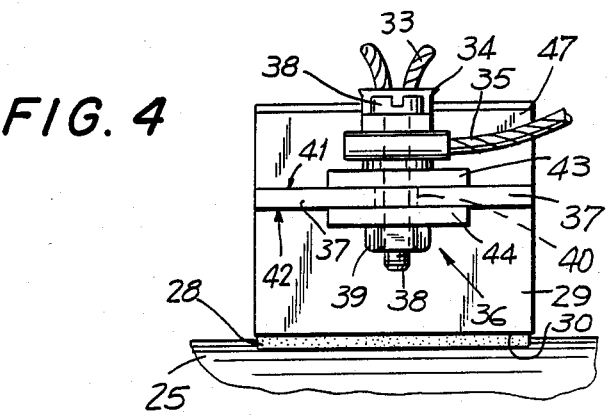
FIG. 4 is a side elevational view, taken along the lines IV—IV, of FIG. 3.
Figure 5:
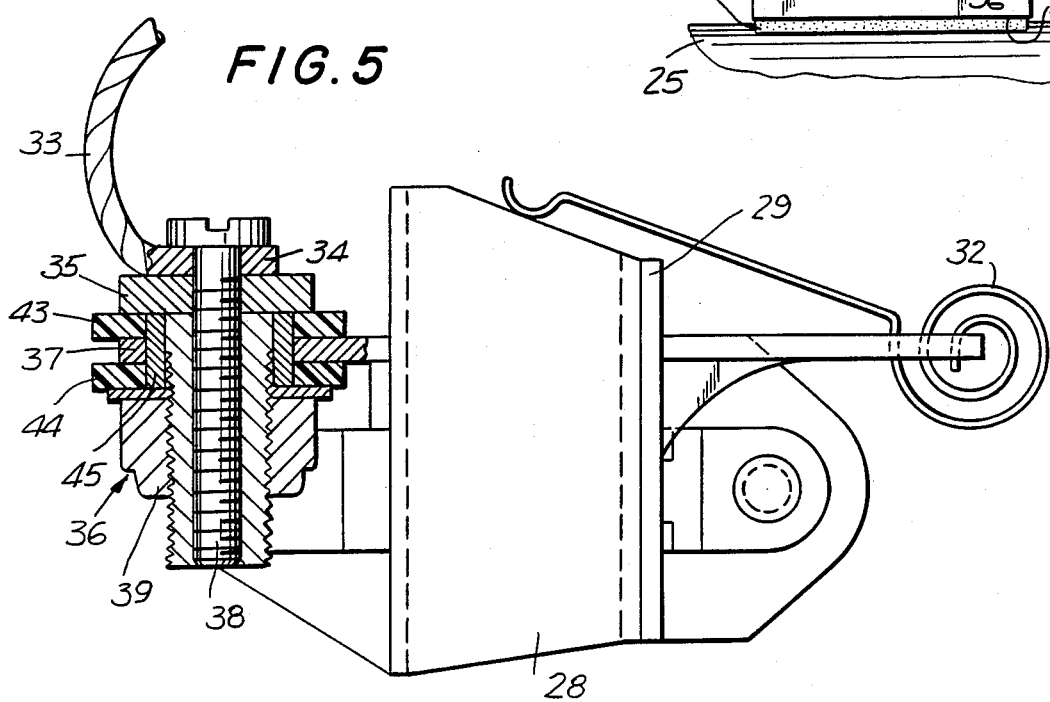
FIG. 5 is a sectional view, on an enlarged scale, of the embodiment of FIG. 3 of the support device of the invention.

The problem of arcing resulting from the disclosed design of brush holder is eliminated by electrically isolating the junction 36 of the pigtail terminal 34 and the stator lead 35 from the brush holder 29, as shown in FIGS. 3, 4 and 5. In accordance with the invention, a support device is affixed to the flange 37 and passes through the hole 40. The support device supports the junction 36 of the pigtail 33 and the conductor 35 from the stator.

The support device of the invention includes a first insulator 43 which electrically isolates the junction 36 from the flange 37 at the first surface 41 of said flange. The first insulator 43 consists of a first washer of electrically insulative material to any suitable known type, which may be the same as that of either or both of the second and third insulators 44 and 45, interposed between the junction 36 and the first surface 41 of the flange 37. The support device of the invention further includes a second insulator 44 which electrically isolates the junction 36 from the flange 37 at the second surface 42 of said flange. The second insulator 44 consists of a second washer of electrically insulative material of any suitable known type, which may be the same as that of either or both of the first and third insulators 43 and 45, interposed between the junction 36 and the second surface 42 of the flange 37.

The support device of the invention also includes a third insulator 45 which electrically isolates the junction 36 from the flange 37 in the hole 40 through said flange. The third insulator 45 consists of a sleeve of electrically insulative material of any suitable known type which may be the same as that of either or both of the first and second insulator 43 and 44 interposed between the junction 36 and the flange 37. As shown in FIGS. 3 and 5, the sleeve 45 extends between the junction 36 and the first and second washers 43 and 44 and, more particularly, between said first and second washers and the terminal screw 38. Suitable electrically insulative material may be a glass laminate.

The insulators 43, 44 and 45 eliminate the electrical path through the brush holder 29, which path is parallel with that through the brush 28. The insulators 43, 44 and 45 at least make the parallel path of such relatively high impedance that they prevent the formation of damaging arcs between the commutator 25 and the edge 30 of the brush holder 29.

Figure 12:
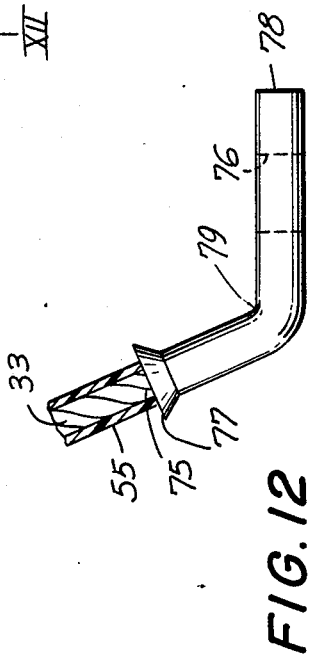
FIG. 12 is a side view, on an enlarged scale, taken along the lines XII—XII, of FIG. 10.

The invention shown in FIGS. 3, 4 and 5 is preferred, since the insulators 43, 44 and 45 may be added to conventional brush holders with very slight modification to provide the sleeve 45 and the first and second washers 43 and 44 around the screw 38. Furthermore, an electrically insulative sleeve 55, of any suitable known type, encases the pigtail 33 as shown in FIG. 12. The electrically insulative sleeve 55 is not shown in any of the other FIGS., in order to maintain the clarity illustration. The electrically insulative sleeve 55 prevents electrical contact between the pigtail 33 and the brush holder 29.

The support device of the invention may be affixed to the housing 7 of the motor, as shown in FIG. 6. In this modification of FIG. 6, the flange 37 of the junction 54 is replaced by a bracket 56 of conductive material, bent so that it has a horizontal portion 57. The support device of FIG. 6 is identical to that of FIGS. 3, 4 and 5 except that the first and second insulators are, identified by reference numerals 58 and 59, respectively, the third insulator not being shown in FIG. 6.

In accordance with another aspect of the invention, a new and improved terminal 34 is utilized to conduct maximum current between the brush 28 and the junction 36 of the pigtail 33 and the stator conductor 35. The heavy current flow through the pigtail terminal 34 prevents arcing between the brush holder 29 and the commutator 25, thereby preventing damage to the dynamoelectric machine. Known pigtail terminals compound the problems of known designs of dynamoelectric machines, since they fail to conduct sufficient current and, as a result overheat, and cause additional damage to the machines. This issue to the current-conducting pigtails 33 and 60 to 74 (FIGS. 10 and 11) being affixed to one end of the terminal in known terminals, whereas the spaced opposite end of the terminal having no extending wires, is placed in electrical contact with the junction 36.

The pigtail terminal 34 of the invention is affixed to the end 75 of the pigtail 33 (FIG. 12) and accommodates the pigtails 33 and 60 to 74, each of said pigtails extending through said terminal. The terminal 34 has a hole 76 formed therethrough (FIGS. 10 and 12) at which electrical connection is made with the junction 36. The hole 76 intercepts a group of the pigtails consisting of the pigtails 65, 66, 67 and 68 in the illustrated example and extends through said pigtails whereby electrical connection is directly effected between said pigtails and said junction.

Figure 10:
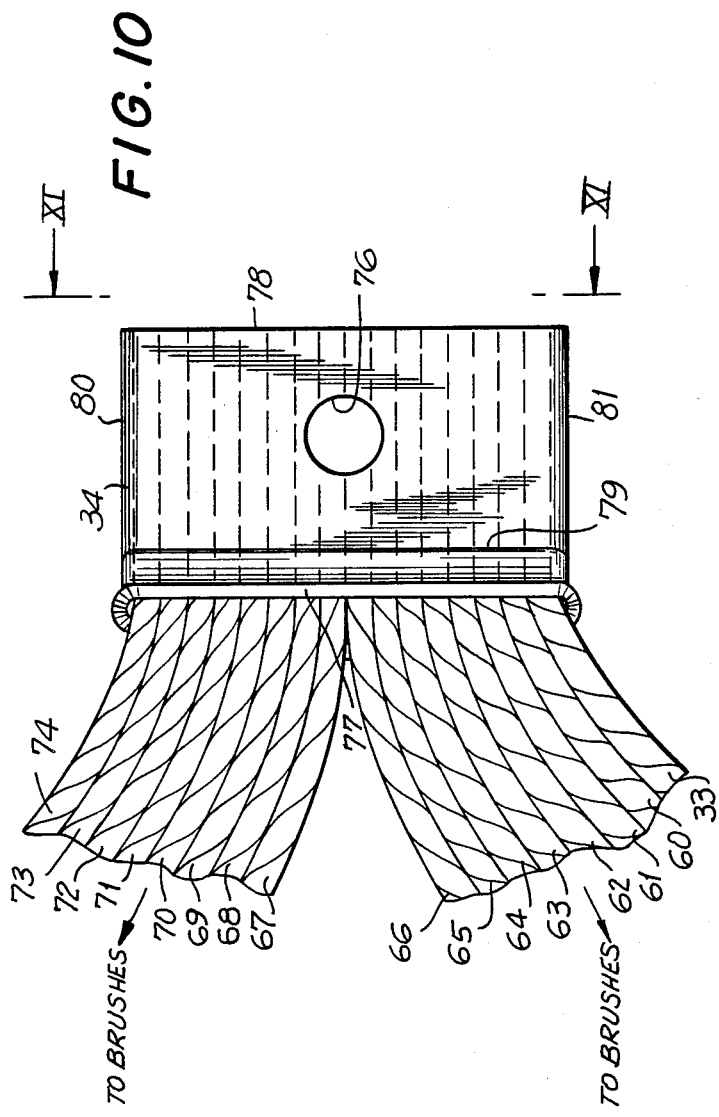
FIG. 10 is a top plan, on an enlarged scale, of an embodiment of the pigtail terminal of the invention.
Figure 11:
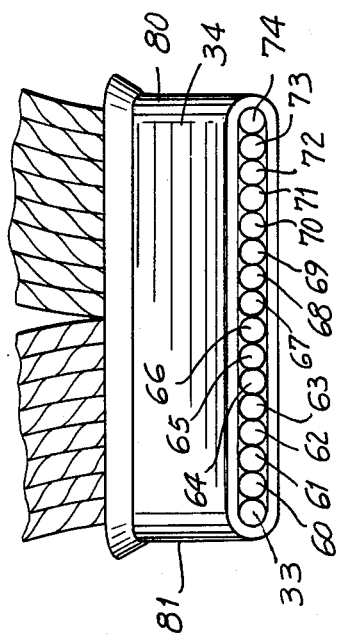
FIG. 11 is an end view, on an enlarged scale, taken along the lines XI—XI, of FIG. 10.

The pigtail terminal 3 comprises a substantially rectangular parallelepiped having first and second spaced opposite substantially parallel open ends 77 and 78, respectively, as shown in FIGS. 10 and 12, and is bent along a line 79 (FIG. 10) substantially parallel to said first and second ends. The line 79 is spaced from the first and second ends 77 and 78, so that the terminal forms an angular member close to 90°, as shown in FIGS. 11 and 12, when bent along said line. The pigtails 33 and 60 to 74 pass into the terminal 34 via the first end 77, are positioned side by side in said terminal and extend to the second end 78, as shown in the FIGS. 10, 11 and 12.

The pigtail terminal 34 has first and second spaced opposite substantially parallel sides 80 and 81 joining the first and second ends 77 and 78, as shown in FIGS. 10 and 11, and substantially perpendicular to said ends. The line 79, along which the terminal is bent is closer to the first end 77 than to the second end 78. The hole 76 is in proximity with the second end 78 and substantially equidistant from the first and second sides 80 and 81, as shown in FIG. 10.

In accordance with still another aspect of the invention, a new and improved brush is utilized to assure a good electrical connection of said brush to the junction 36. The brush 28 of the invention, shown in FIGS. 7, 8 and 9, has a top surface 82 (FIGS. 7 to 9) spaced from the commutator 25, a front surface 83 (FIGS. 7 and 9) meeting said top surface at a front edge 84 thereof (FIGS. 7 and 9) and a back surface 85 (FIG. 7 and 8) meeting said top surface at a spaced opposite rear edge 86 thereof (FIGS. 7 and 9). First and second spaced substantially parallel side holes 87 and 88 are formed through the brush 28 open on the front and rear surfaces 83 and 85, as shown in FIGS. 8 and 9. First and second spaced substantially parallel top 89 and 90 are formed in the brush 28 and open on the top surface 82 and extend to the first and second side holes 87 and 88, respectively. Each of the top holes 89 and 90 accommodates two of the plurality of brush pigtails 33 and 60 to 74. The pigtails are not shown in FIGS. 7 to 9.

An electrically conductive hammer plate 91 has a back plate 92 (FIGS. 7 to 9) and a top plate 93 (FIGS. 7 and 9) extending from said back plate at an acute angle therewith, as shown in FIG. 7. The back plate 92 has a pair of spaced holes 94 and 95 formed therethrough (FIGS. 8 and 9). First and second electrically conductive members 96 and 97, respectively, extend through the holes 94 and 95 of the back plate 92 and the first and second side holes 87 and 88 of the brush 28 and affix the hammer plate to said brush, as shown in FIGS. 7 to 9, with said back plate in juxtaposition with the back surface 85 of said brush and the top plate 93 in juxtaposition with the top surface 82 of said brush. Brush pigtails accommodated in the first and second top holes 89 and 90, which pigtails are not shown in FIGS. 7 to 9 in order to maintain the clarity of illustration, are in electrical contact with the first and second electrically conductive members 96 and 97, respectively. The electrically conductive members 96 and 97 preferably comprise substantially solid rivets.

The top plate 93 of the hammer plate 91 has a width dimension W1 (FIG. 9) whereby it is positioned between and spaced from the first and second top holes 89 and 90. The back plate 92 of the hammer plate 91 has a width dimension W2 (FIG. 8) greater than that of the top plate 93 and extends over the width W3 (FIG. 8) of the back surface of the brush 28. The top plate 93 has a pair of flanges 98 and 99 extending at substantially right angles thereto at spaced opposite side edges thereof, as shown in FIGS. 8 and 9.

While the invention has been described by means of a specific example and in a specific embodiment, I do not wish to be limited thereto, for obvious modifications will occur to those skilled in the art without departing from the spirit and scope of the invention.

I claim:

1. A dynamoelectric machine having a housing, a rotatable commutator within the housing, a brush contacting said commutator, said brush having a top surface spaced from said commutator, a front surface meeting said top surface at a front edge thereof and a back surface meeting said top surface at a spaced opposite rear edge thereof, first and second spaced substantially parallel side holes formed through said brush and opening on said front and rear surfaces and first and second spaced substantially parallel top holes formed in said brush opening on said top surface and extending to said first and second side holes, respectively, said top holes accommodating a plurality of brush pigtails, an electrically conductive brush holder affixed to said housing and supporting said brush, a brush pigtail having a first end connected to said brush and a second end, said pigtail having a plurality of stranded electrically conductive wires, and electrical conductor connected to said pigtail at a junction, said machine comprising support means affixed to said housing and passing through said hole for supporting the junction of said pigtail and said conductor, said support means including a bracket extending from said housing, said bracket having a hole formed therethrough and spaced opposite first and second surfaces;

a first insulator which electrically isolates said junction from said bracket at the first surface of said bracket;

a second insulator which electrically isolates said junction from said bracket at the second surface of said bracket;

a third insulator which electrically isolates said junction from said bracket in said hole; and a terminal at the second end of said pigtail for conducting maximum current between said brush and said junction, said terminal accommodating a plurality of pigtails, each extending through said terminal, and having a hole formed therethrough at which electrical connection is made with said junction, said hole intercepting a group of said plurality of pigtails in a manner whereby electrical connection is directly effected between said pigtails and said junction when said junction passes through said hole; and an electrically conductive hammer plate having a back plate and a top plate extending from said back plate at an acute angle therewith, said back plate having a pair of spaced holes formed therethrough, and first and second electrically conductive members extending through said holes of said back plate and said first and second side holes of said brush and affixing said hammer plate to said brush with said back plate in juxtaposition with said back surface of said brush and said top plate in juxtaposition with said top surface or said brush, said brush pigtails accommodated in said first and second top holes being in electrical contact with said first and second electrically conductive members, respectively.

2. A dynamoelectric machine as claimed in claim 1, further comprising an electrically insulative sleeve encasing said brush pigtail.

3. A brush for the commutator of a dynamoelectric machine, said brush having a top surface spaced from said commutator, a front surface meeting said top surface at a front edge thereof and a back surface meeting said top surface at a said opposite rear edge thereof, said brush comprising first and second spaced substantially parallel side holes formed through said brush and opening on said front and rear surfaces;

first and second spaced substantially parallel top holes formed in said brush opening on said top surface and extending to said first and second side holes, respectively, said top holes accommodating a plurality of brush pigtails; and an electrically conductive hammer plate having a back plate and a top plate extending from said back plate at an acute angle therewith, said back plate having a pair of spaced holes formed therethrough; and first and second electrically conductive members extending through said holes of said back plate and said first and second side holes of said brush and affixing said hammer plate to said brush with said back plate in juxtaposition with said back surface of said brush and said top plate in juxtaposition with said top surface of said brush, said brush pigtails accommodated in said first and second top holes being in electrical contact with said first and second electrically conductive members, respectively.

4. A brush as claimed in claim 3, wherein said electrically conductive members comprise substantially solid rivets, said top plate of said hammer plate has a width dimension whereby it is positioned between and spaced from said first and second top holes, said top plate has a pair of flanges extending at substantially right angles thereto at spaced opposite side edges thereof, and said back plate of said hammer plate has a width dimension greater than that of said top plate and extends over the width of said back surface of said brush.

5. A dynamoelectric machine having a housing, a rotatable commutator within the housing, a brush contacting said commutator, an electrically conductive brush holder affixed to said housing and supporting said brush, brush pigtails connected to said brush, an electrical conductor connected to said pigtails at a junction, and a flange extending from said brush holder, said flange having a hole formed therethrough and spaced opposite first and second surfaces, said machine comprising electrically insulative sleeves encasing said brush pigtails; and support means affixed to said flange and passing through said hole for supporting the junction of said pigtails and said conductor, said support means including a first washer of electrically insulative material interposed between said junction and said first surface of said flange for electrically isolating said junction from said flange at said first surface of said flange;

a second washer of electrically insulative a material interposed between said junction and said second surface of said flange for electrically isolating said junction from said flange at said second surface of said flange; and a sleeve of electrically insulative material interposed between said junction and said flange and extending between said junction and said first and second washers of electrically isolating said junction from said flange in said hole.

6. A dynamoelectric machine as claimed in claim 5, wherein said brush has a top surface spaced from said commutator, a front surface meeting said top surface at a front edge thereof and a back surface meeting said top surface at a spaced opposite rear edge thereof, first and second spaced substantially parallel side holes formed through said brush and opening on said front and rear surfaces and first and second spaced substantially parallel top holes formed in said brush opening on said top surface and extending to said first and second side holes, respectively, said top holes accommodating a plurality of brush pigtails, and further comprising an electrically conductive hammer plate having a back plate and a top plate extending from said back plate at an acute angle therewith, said back plate having a pair of spaced holes formed therethrough, and first and second electrically conductive members extending through said holes of said back plate and said first and second side holes of said brush and affixing said hammer plate to said brush with said back plate in juxtaposition with said back surface of said brush and said top plate in juxtaposition with said top surface of said brush, said brush pigtails accommodated in said first and second top holes being in electrical contact with said first and second electrically conductive members, respectively.

7. A dynamoelectric machine as claimed in claim 6, wherein said electrically conductive members comprise substantially solid rivets, said top plate of said hammer plate has a width dimension whereby it is positioned between and spaced from said first and second top holes and a pair of flanges extending at substantially right angles thereto a spaced opposite side edges thereof, and said back plate of said hammer plate has a width dimension greater than that of said top plate and extends over the width of said back surface of said brush.

8. A dynamoelectric machine having a housing, a rotatable commutator within the housing, a brush contacting said commutator, and supporting said brush, a brush pigtail having a first end connected to said brush and a second end, said pigtail having a plurality of stranded electrically conductive wires, an electrical conductor connected to said pigtail at a junction, and a flange extending from said brush holder, said flange having a hole formed therethrough and spaced opposite first and second surfaces, said machine comprising a terminal at the second end of said pigtail for conducting maximum current between said brush and a junction of said pigtail and said conductor, said terminal accommodating a plurality of pigtails, each extending through said terminal, and having a hole formed therethrough at which electrical connection is made with said junction, said hole intercepting a group of said plurality of pigtails in a manner whereby electrical connection is directly effected between said pigtails and said junction when said junction passes through said hole through said terminal, said terminal comprising a substantially rectangular parallelepiped having first and second spaced opposite substantially parallel open ends and bent along a line substantially parallel to said first and second ends and spaced therefrom to form an angular member, said plurality of pigtails passing into said terminal via said first end, being positioned substantially side by side in said terminal and extending to said second end; and electrically insulative sleeves encasing said plurality of pigtails.

9. A dynamoelectric machine as claimed in claim 8, further comprising insulative means for electrically isolating said junction from said flange at the first and second surfaces of said flange, said insulative means comprising support means affixed to said flange and passing through said hole through said flange for supporting the junction of said pigtail and said conductor, said support means including a first washer of electrically insulative material interposed between said junction and said first surface of said flange, a second washer of electrically insulative material interposed between said junction and said second surface of said flange, and a sleeve of electrically insulative material interposed between said junction and said flange and extending through said hole through said flange between said junction and said first and second washers.

10. A dynamoelectric machine as claimed in claim 8, wherein said terminal further comprises first and second spaced opposite substantially parallel sides joining said first and second ends and substantially perpendicular thereto, and wherein said terminal is bent along a line closer to said first end than to said second end and said hole through said terminal is in proximity with said second end and substantially equidistant from said first and second sides.

11. A dynamoelectric machine having a housing, a rotatable commutator within the housing, a brush contacting said commutator, an electrically conductive brush holder affixed to said housing and supporting said brush, brush pigtails connected to said brush, and an electrical conductor connected to said pigtails at a junction, said machine comprising electrically insulative sleeves encasing said brush pigtails; and support means affixed to said housing for supporting the junction of said pigtails and said conductor, said support means including a bracket extending from said housing, said bracket having a hole formed therethrough and opposite first and second surfaces;

a first washer of electrically insulative material interposed between said junction and said first surface of said bracket for electrically isolating said junction from said bracket at said first surface of said bracket;

a second washer of electrically insulative material interposed between said junction and said second surface of said bracket for electrically isolating said junction from said bracket at said second surface of said bracket; and a sleeve of electrically insulative material interposed between said junction and said bracket and extending between said junction and said first and second washers for electrically isolating said junction from said bracket in said hole.

12. A dynamoelectric machine as claimed in claim 11, wherein said brush has a top surface spaced from said commutator, a front surface meeting said top surface at a front edge thereof and a back surface meeting said top surface at a spaced opposite rear edge thereof, first and second spaced substantially parallel side holes formed through said brush and opening on said front and rear surfaces and first and second spaced substantially parallel top holes formed in said brush opening on said top surface and extending to said first and second side holes, respectively, said top holes accommodating a plurality of brush pigtails, and further comprising an electrically conductive hammer plate having a back plate and a top plate extending from said back plate at an acute angle therewith, said back plate having a pair of spaced holes formed therethrough, and first and second electrically conductive members extending through said holes of said back plate and said first and second side holes of said brush and affixing said hammer plate to said brush with said back plate in juxtaposition with said back surface of said brush and said top plate in juxtaposition with said top surface of said brush, said brush pigtails accommodated in said first and second top holes being in electrical contact with said first and second electrically conductive members, respectively.

13. A dynamoelectric machine as claimed in claim 12, wherein electrically conductive members comprise substantially solid rivets, said top plate of said hammer plate has a width dimension whereby it is positioned between and spaced from said first and second top holes and a pair of flanges extending at substantially right angles thereto at spaced opposite side edges thereof, and said back plate of said hammer place has a width dimension greater than that of said top plate and extends over the width of said back surface of said brush.

* * * * *